US009306609B1

(12) United States Patent
LaCroix

(10) Patent No.: US 9,306,609 B1
(45) Date of Patent: Apr. 5, 2016

(54) DC-COUPLED DIFFERENTIAL CIRCUIT FRONT END

(71) Applicant: Marc-Andre LaCroix, Ottawa (CA)

(72) Inventor: Marc-Andre LaCroix, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/595,303

(22) Filed: Jan. 13, 2015

(51) Int. Cl.
*H04B 3/00* (2006.01)
*H04B 1/16* (2006.01)
*H04B 3/54* (2006.01)

(52) U.S. Cl.
CPC . *H04B 1/16* (2013.01); *H04B 3/548* (2013.01)

(58) Field of Classification Search
CPC ............ H04L 25/0274; H04L 25/0296; H04L 25/03878; H04B 1/16; H04B 3/00; H04B 3/30; H04B 3/46; H04B 3/50; H04B 3/548; H04B 3/56
USPC ......... 375/229, 257, 292, 316, 318, 346, 377; 327/100, 103–104; 326/30; 455/230
See application file for complete search history.

(56) References Cited

U.S. PATENT DOCUMENTS

| 8,552,710 | B2* | 10/2013 | Lee ................... | H05B 33/0815 324/98 |
| 2005/0094737 | A1* | 5/2005 | Vorenkamp ............. | H04L 25/08 375/257 |
| 2005/0281343 | A1* | 12/2005 | Hsu ................... | H04L 25/03343 375/257 |
| 2006/0067440 | A1* | 3/2006 | Hsu ....................... | H03F 1/3241 375/345 |
| 2007/0290904 | A1* | 12/2007 | Kobayashi .......... | G06F 13/4068 341/126 |
| 2009/0074110 | A1* | 3/2009 | Vorenkamp ............. | H04L 25/08 375/317 |
| 2009/0079498 | A1* | 3/2009 | Drost .................. | H03F 3/45973 330/129 |
| 2013/0287084 | A1* | 10/2013 | Bankman ............ | H03F 3/45076 375/229 |
| 2014/0256276 | A1* | 9/2014 | Li ............................ | H04B 3/30 455/230 |

* cited by examiner

Primary Examiner — Khanh C Tran

(57) ABSTRACT

A front-end of a first differential circuit is DC-coupled to a second differential circuit. The front-end comprises a resistive element, a voltage sensor and a current adjustor. The resistive element has a resistivity between a first end that is DC-coupled to the second circuit and a second end that is DC-coupled to the first circuit and accepts a programmable current passing therethrough to impose a voltage across the element that varies in direction and amplitude according to the current value. The voltage sensor senses a difference between a DC voltage at the second end of the resistive element and a desired reference voltage of the first circuit. The current adjustor adjusts a direction and amplitude of the programmable current so that the voltage of the first circuit matches the desired reference voltage of the first circuit. The first circuit may be a receiver circuit and the second circuit may be a transmitter circuit. The front-end may further comprise a current canceller comprising a second resistive element connected at a first end to the output of the second circuit. The current canceller senses the programmable current and generates a current of equal amplitude through the second resistive element and away from the output of the second circuit. The current canceller may be implemented in digital or analog form and/or in differential or common-mode operation.

36 Claims, 7 Drawing Sheets

DC-COUPLED DIFFERENTIAL CIRCUIT FRONT END

RELATED APPLICATIONS

Not Applicable.

TECHNICAL FIELD

The present disclosure relates to communications receivers and in particular to differential voltage receivers.

BACKGROUND

Modern wireline communications systems often employ integrated circuits (ICs) embodying transmitters and receivers that communicate with differential signalling over copper traces on printed circuit boards (PCBs).

Differential signalling is employed to increase immunity to noise. A differential signalling scheme applies a pair of complementary signals across a pair of signal wires, such that the information content is contained only by the difference in the signal between the wires. Since external interference tends to affect both wires in the pair similarly, this scheme tends to improve resistance to electromagnetic noise compared with signalling schemes that employ a single wire containing the information content and an unpaired reference ground.

The receiver may receive a transmission from a transmitter with different operating point characteristics, whether or not manufactured by a different entity. Different architectures of the circuits, and/or the absence of a common reference ground between the transmitter and the receiver means that a differential signal generated by the transmitter may have different electrical characteristics from the differential signal expected to be received by the receiver, including their respective DC operating points.

The potential disparity between the electrical characteristics of the transmitter and the receiver may be alleviated, in some example cases, by isolating the DC condition of the receiver from that of the transmitter.

In some example cases, this may be achieved by interposing a discrete capacitor on one of the PCBs between the transmitter and the receiver, such as is shown in FIG. 1. A transmitter IC 10 comprises at least one transmitter circuit Tx(i) 11$i$ (only a first Tx(a) 11$a$ and last example Tx(m) 11$/k$ of which are shown, with ellipses denoting others for ease of illustration—the "i" referring to any one of these in the range of a . . . k), employing differential signalling across respective differential signalling pairs of transmit signal traces (Tx(i)p 12$ip$, Tx(i)m 12$im$), where subscript p denotes the positive differential signal and subscript m denotes the minus differential signal, that connect to respective copper traces 22$ip$, 22$im$, on a PCB 20. Each transmit signal trace Tx(i)p 12$ip$, Tx(i)m 12$im$ has a corresponding transmit termination resistor $R_{TXip}$ 13$ip$, $RT_{Xim}$ 13$im$ at a back end of the transmitter IC 10.

Similarly, a receiver IC 30 comprises at least one receiver circuit Rx(i) 31$i$, employing differential signalling across respective differential signalling pairs of receive signal traces (Rx(i)p 32$ip$, RX(i)m 32$im$) that connect to respective copper traces 22$ip$, 22$im$ on PCB 20. Each receive signal trace Rx(i)p 32 $ip$, Rx(i)m 32$im$ has a corresponding receive termination resistor $R_{RXip}$ 33$ip$, $R_{RXim}$ 33 $im$ at a front end of the receiver IC 30. The receive termination resistor pairs $R_{RXip}$ 33$ip$, $R_{RXim}$ 33 $im$ are positioned in shunt across the corresponding receive signal trace pairs Rx(i)p 32$ip$, Rx(i)m 32$im$, with their common terminal connected to a local reference voltage.

Thus, absent the interposition of a discrete capacitor 21$ip$, 21$im$ on the PCB across each copper trace 22$ip$, 22$im$, the differential signalling traces Tx(i)p 12 $ip$, Tx(i)m 12$im$ on the transmitter IC 10 would be DC-coupled to the differential signalling traces Rx(i)p 32$ip$, Rx(i)m 32$im$ on the receiver IC 30.

Such discrete PCB capacitors 21$ip$, 21$im$, also referred to as "AC-coupling" capacitors, on the PCB 20, combine with the corresponding receiver termination resistor $R_{RXip}$ 33$ip$, $R_{RXim}$ 33$im$ at the front end of the receiver IC 30 to form a high-pass filter that allows most of the signal energy arriving along the corresponding copper trace 22$ip$, 22$im$ to pass, while blocking DC and thus rendering substantially irrelevant the different operating points of the transmitter IC 10 and receiver IC 30.

In some example embodiments, the fact that the AC-coupling capacitors are discrete components facilitates the employ of large capacitance values on the order of 100 nF, to achieve a filter cut-off frequency that is relatively low, on the order of 50 kHz or lower, so as to minimally impair the wide frequency spectrum of the input data stream.

However, as demands for communication bandwidth increases, there is a corresponding increasing pressure to increase the channel density of ICs. In such an environment, the space and cost of interposing discrete AC-coupling capacitors on the PCB 20 becomes increasingly difficult.

One mechanism to dispense with a discrete PCB AC-coupling capacitor, by employing integrated AC-coupling capacitors C1$p$ 34$p$, C1$m$ 34$m$ on the front-end of the receiver IC 30, is shown in FIG. 2. Such integrated capacitors may be used to achieve signal attenuation by forming a capacitive divider with capacitors C2$p$ 39$p$, C2$m$ 39$m$. Capacitors C2$p$ 39$p$, C2$m$ 39$m$ may be a device element added for the capacitive divider function or can be a proxy for any parasitic capacitance that is present at the receiver 31.

For ease of illustration, only one of the receiver circuits Rx(i) 31$i$ is shown (and the generic subscript i has been omitted throughout), although those having ordinary skill in the art will appreciate that a given receiver IC 30 may employ a plurality of such receiver circuits. Also for ease of illustration, the copper traces 22$p$, 22$m$ are omitted and the transmit differential signalling traces Txp 12$p$, Txm 12$m$ are shown directly connected to the receive differential signalling traces Rxp 32$p$, Rxm 32$m$.

In the example of FIG. 2, the single pair of receive termination resistors $R_{RXp}$ 33$p$, $R_{Rxm}$ 33$m$ shown in FIG. 1 is replaced by receive termination resistors R1$p$ 35$p$, Rim 35$m$ between the corresponding receive signal trace pairs Rxp 32$p$, Rxm 32$m$ and a common terminal between them. The common terminal between the receive termination resistors R1$p$ 35$p$, R1$m$ 35$p$ may in some cases be decoupled from a ground point GND 37 by a respective decoupling capacitor Ccm 38. The common terminal between the second pair of receive termination resistors (R2$p$ 36$p$, R2$m$ 36$m$) provides an independent receiver DC voltage reference VcmRef 40 for use by the receiver circuit Rx 31. A second set of capacitors C2$p$ 39$p$, C2$m$ 39$m$ are connected across the corresponding receive signal trace pairs Rxp 32$p$, Rxm 32$m$, with the common terminal therebetween connected to the ground point GND 37.

Thus, the DC condition of the receiver circuit Rx 31 remains isolated from the corresponding transmitter circuit Tx 11 by the on-die capacitors C1$p$ 34$p$, C1$m$ 34$m$, while the high-pass filter created by the on-die capacitors C1$p$ 34$p$, C1$m$ 34$m$, in conjunction with the resistors R2$p$ 36$p$, R2$m$ 36m, allows most of the signal energy arriving along the corresponding pair of transmit traces 12p, 12m to pass.

Because the capacitance density of on-die capacitors is typically much lower than that of discrete capacitors, achieving a capacitance value using the on-die capacitors C1p 34p, C1m 34m that approaches that of the discrete case would involve the allocation of an impractical amount of silicon area. Further, the parasitic/stray capacitance to GND 37 is in shunt with the termination resistors R1p 35p, R1m 35m. At higher frequencies, the impedance of the parasitic capacitance will approach that of the termination resistor. This will result in a decrease of input impedance with frequency, resulting in worsening of matching between the transmission lines, such that the parasitic capacitance would limit the differential return loss performance that imposes a practical bound on the maximum capacitance value of the on-die capacitors C1p 34p, C1m 34m, to a value of up to 5 orders of magnitude smaller than that of the discrete AC-coupling capacitor(s) shown in FIG. 1.

With the imposition of such a bound, an alternative mechanism to reduce the cut-off frequency is to maximize the resistance of the second pair of resistors R2p 32p, R2m 32m. However, doing so also increases the amount of silicon area consumed. In some cases, a higher cut-off frequency is accepted in order to reduce the resistor size to a manageable dimension.

The trade-off of so doing, however, is the introduction of baseline wander (BLW), which manifests due to a relatively higher cut-off frequency of the high pass filter, with a concomitant reduction in signal-to-noise ratio (SNR) at the receiver. Baseline wander is an effect where the base axis of a signal (if viewed on a screen) appears to wander or move up and down causing the signal to shift from its normal base and resulting in decreased SNR. The baseline wander problem is exacerbated at low data rates.

Because modern wireline transceivers may operate at upwards of data rates of 32 Gb/s, the receiver circuit Rx 31 may be in some example embodiments designed to meet stringent performance constraints at these high data rates, resulting in a relatively small value of the on-die capacitor C1p 34p, C1m 34m. However, in so doing, such receiver circuits Rx 31 may suffer from poor baseline wander performance when operating at legacy rates as low as 125 Mb/s that are still to be supported by such circuits.

A further mechanism to dispense with a discrete PCB AC-coupling capacitor by employing integrated AC-coupling capacitors on the front-end of the receiver IC 30 is discussed in Dong, Y. et al., "Integrated Linear AC-coupling Circuit for DC-Balanced and Non-Balanced Traffics", *Proceedings of the IEEE International Symposium on Circuits and Systems* (2007), at pp. 2132-2135 and is generally shown in FIG. 3. This example embodiment differs from that of FIG. 2 in that baseline wander correction circuitry is introduced, in an attempt to mitigate any performance degradation due to baseline wander, especially at low data rates.

As with the example of FIG. 2, the DC condition of the receiver 31 is fully isolated from the transmitter 11 by the on-die capacitors 34p, 34m.

However, in this example, the baseline wander correction circuitry re-inserts the low-frequency energy lost due to the high-pass filter formed by the combination of the on-die capacitors 34p, 34m with the second pair of receive termination resistors 32p, 32m. The recovered data now passes through a low-pass filter formed from the same components as the high pass filter. As such, it is the inverse. Now the low frequency is introduced in this feedback path, while high frequencies are filtered. Thus, low frequency content is re-introduced, alleviating the problem of baseline wander. The baseline wander correction circuitry comprises a circuit for reconstructing the received data stream and a feedback circuit 44 for restoring the lost energy. In some example embodiments, the equalization circuit may comprise a digitizer 41 for digitizing the received data stream and a decision circuit 42. The decision circuit 42 recovers a clock signal 43 from the received data stream to clock the digitizer 41. The differential outputs of the digitizer 41 are fed in as inputs to the feedback circuit 44 so that lost energy is re-introduced into the receiver circuit, effectively producing current adaptation that reduces the observed baseline wander. The feedback circuit 44 generates the independent receiver DC voltage reference Vcm-Ref 40.

It will be appreciated that the baseline wander correction and control of the differential voltage at the receiver are performed simultaneously by the example embodiment of FIG. 3.

The baseline wander correction circuitry described in FIG. 3 mitigates the resulting baseline wander experienced by these AC-coupled circuits that employ integrated on-die capacitors and thus dispense with discrete AC-coupling capacitors. However, the effectiveness of the baseline wander correction circuitry is dependent upon the data recovery performance of the receiver 30. Thus, it may be seen that there is imposed a co-dependency between the link adaptation that governs the recovery of the received signals, as measured by the error rate, and the baseline wander correction. Such co-dependency may have deleterious effects. Furthermore, because the baseline wander correction in the example embodiment of FIG. 3 relies upon effective data recovery of the received data, the circuitry is dependent on a mechanism to reconstruct the received data stream. Accessing the recovered symbols for this purpose can cost additional power since these are high-speed nodes.

BRIEF DESCRIPTION OF THE DRAWINGS

Example embodiments of the present disclosure will now be described by reference to the following figures, in which identical reference numerals in different figures indicate identical elements and in which.

SUMMARY

Figure 1:
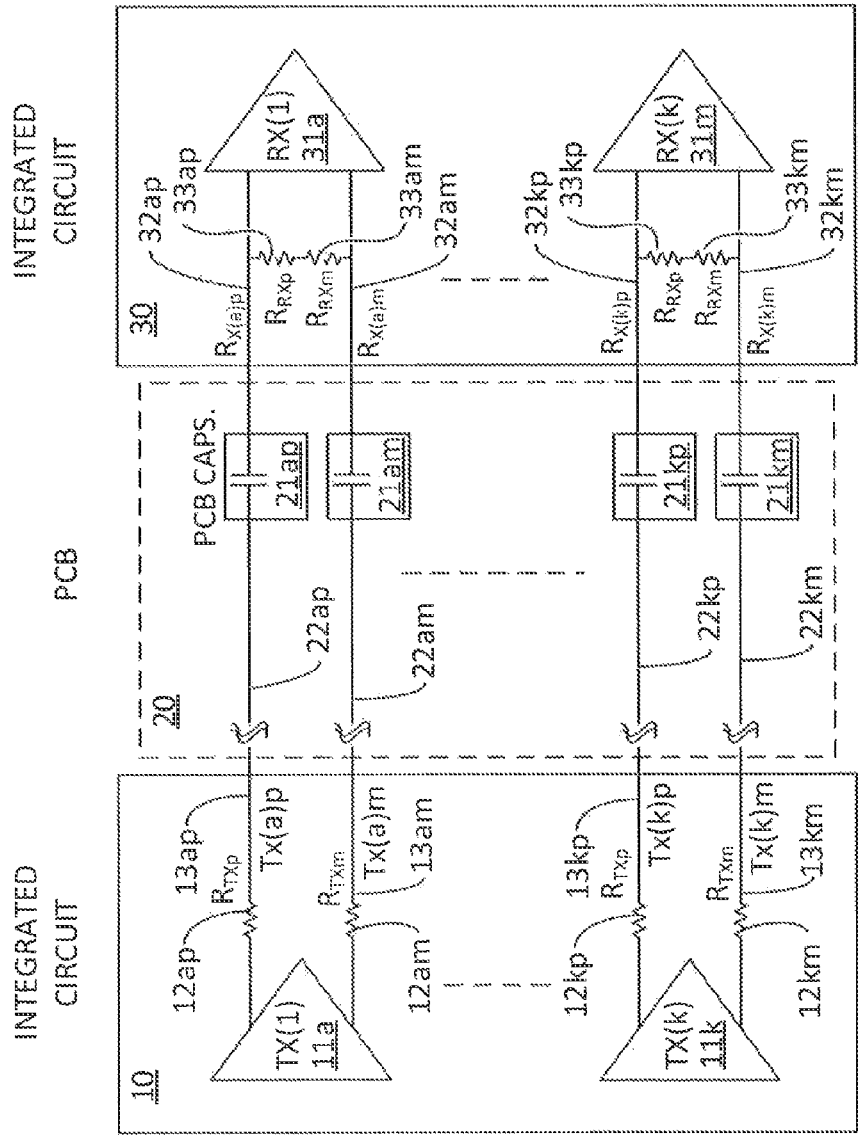
FIG. 1 is a schematic view of an example embodiment of a communications link between a transmitter IC and a receiver IC with at least one AC-coupling capacitor interposed therebetween to isolate the DC condition of the respective ICs.
Figure 2:
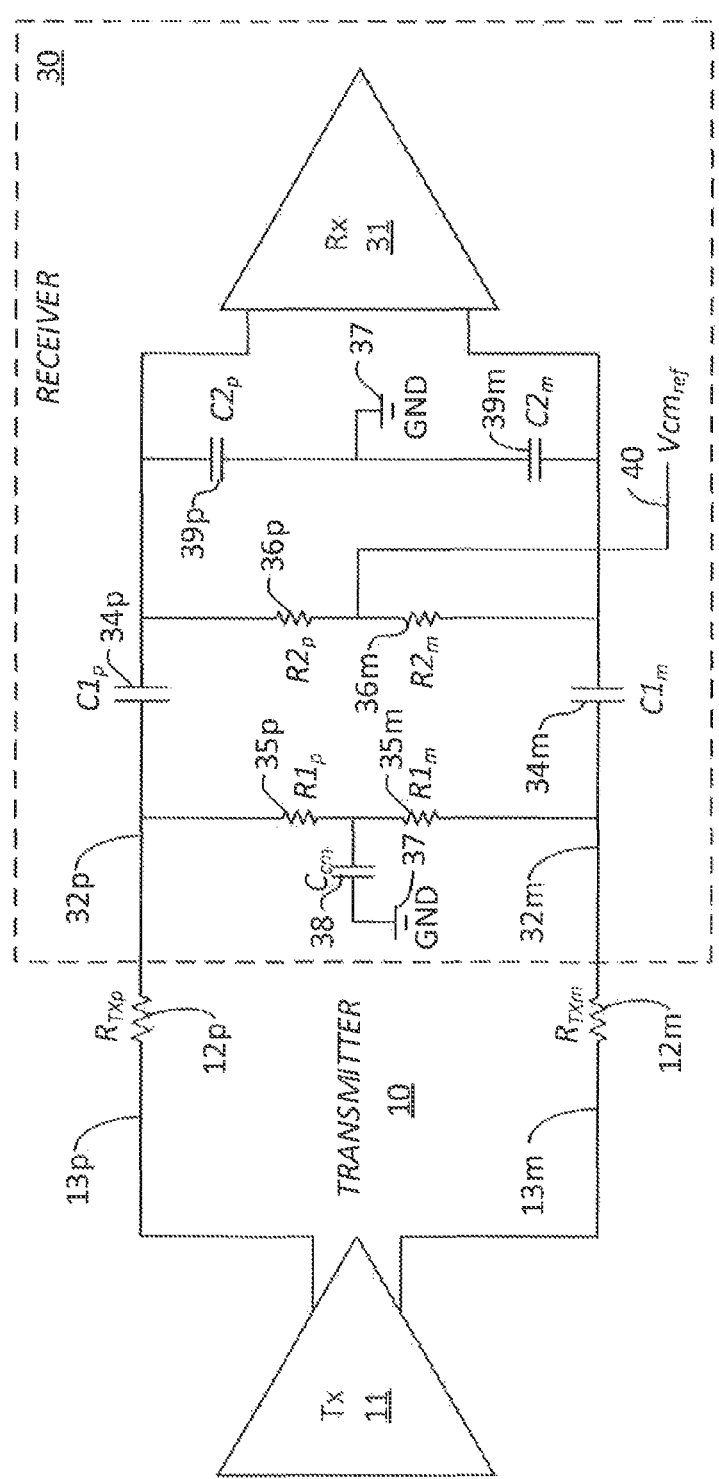
FIG. 2 is a schematic view of an example embodiment of an IC receiver circuit front-end with integrated AC-coupling capacitor.
Figure 3:
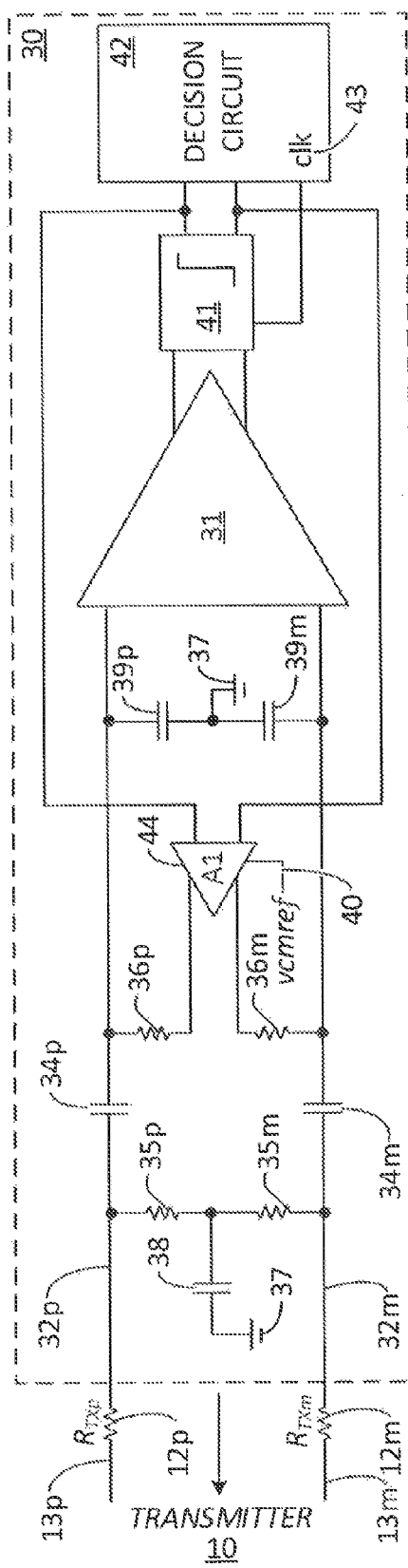
FIG. 3 is a schematic view of an example embodiment of an IC receiver circuit front-end with integrated AC-coupling capacitors and baseline wander (BLW) correction circuitry.

The present disclosure takes a different approach to interfacing a differential voltage transmitter with a differential voltage receiver. Rather than preventing DC-coupling between the transmitter 11 and the receiver 31, such as through a discrete AC-coupling capacitor, or an integrated on-die proxy therefor, the present disclosure encourages DC-coupling between the transmitter and the receiver, and addresses the potential for different DC operating points by sourcing or sinking a current across a resistor placed in series between the transmitter and the receiver 31, thus maintaining a local dedicated independent receiver DC voltage irrespective of what DC voltage is presented by the transmitter 11. In so doing, PCB capacitors are avoided.

Because the transmitter 11 and receiver 13 are DC-coupled, low frequencies are not attenuated by a high-pass transfer function as they progress to the amplifier circuits of the receiver 31, thus dispensing entirely with the baseline wander problem.

In one example-embodiment of the present disclosure, there is provided a front-end of a first differential circuit that is DC-coupled to a second differential circuit. The first circuit front-end comprises a resistive element, a voltage sensor and a current adjustor.

The resistive element has a resistivity between a first end that is DC-coupled to the second circuit and a second end that is DC-coupled to the first circuit and accepts a programmable current passing therethrough to impose a voltage across the element that varies in direction and amplitude according to the current value.

The voltage sensor senses a difference between a DC voltage at the second end of the resistive element and a desired reference voltage of the first circuit.

The current adjustor adjusts a direction and amplitude of the programmable current so that the DC voltage of the first circuit matches the desired reference voltage of the first circuit.

The first circuit can be a receiver circuit and the second circuit can be a transmitter circuit.

The resistive element can be a resistor.

The voltage sensor can comprise a comparator for comparing the DC voltage with the desired reference voltage.

The current adjustor can comprise a current source. The current source can generate current if the desired reference voltage is greater than the DC voltage. An amplitude of the current generated by the current source can increase in proportion to an amount the desired reference voltage exceeds the DC voltage and/or decrease in proportion to an amount the desired reference voltage is exceeded by the DC voltage. The current source can be positioned between a positive DC voltage and the second end of the resistive element. The current source can be a digital-to-analog converter (DAC) for outputting a current value in response to a digital current input value.

The current adjustor can comprise a current sink. The current sink can sink current if the desired reference voltage is less than the DC voltage. An amplitude of the current sunk by the current sink can decrease in proportion to an amount the desired reference voltage exceeds the DC voltage and/or increase in proportion to an amount the desired reference voltage is exceeded by the DC voltage. The current sink can be positioned between the second end of the resistive element and a reference ground. The current sink can be a digital-to-analog converter (DAC) for outputting a current value in response to a digital current input value.

The current adjustor can comprise a feedback control circuit for controlling an amount and direction of current generated in response to a comparison between the desired reference voltage and the DC voltage. The feedback control circuit can generate a mode signal for accessing the voltage sensor and current adjustor in a common-mode or in a differential mode.

In one example embodiment of the present disclosure, there is provided a front-end of a first differential circuit that is DC-coupled to an output of a second differential circuit. The front-end comprises a first resistive element, a voltage sensor, a current adjuster and at least one current canceller.

The first resistive element has a resistivity between a first end that is DC-coupled to the second circuit and a second end that is DC-coupled to the first circuit and accepts a programmable current passing therethrough to impose a voltage across the element that varies in direction and amplitude according to the current value.

The voltage sensor senses a difference between a DC voltage at the second end of the first resistive element and a desired reference voltage of the first circuit.

The current adjuster adjusts a direction and amplitude of the programmable current so that the DC voltage of the first circuit matches the desired reference voltage.

The current canceller comprises a second resistive element coupled at a first end to the output of the second circuit. The current canceller senses the programmable current and generates a current of equal amplitude through the second resistive element and away from the output of the second circuit.

The first circuit can be a receiver circuit and the second circuit can be a transmitter circuit.

The second resistive element can be a resistor.

The current canceller can sense the programmable current by sensing a voltage at each end of the first resistive element and determining a first difference therein that is proportional to the programmable current by a known resistivity of the first resistive element. The current canceller can sense the current generated through the second resistive element by sensing a voltage at each end of the second resistive element and determining a second difference therein that is proportional to the generated current by a known resistivity of the second resistive element. The current canceller can comprise a feedback loop having the first and second differences as inputs and for generating as an output, the generated current. The feedback loop can adjust the generated current until the second difference approaches the first difference. The known resistivity of the first resistive element can be equal to the resistivity of the second resistive element.

The feedback loop can comprise an op-amp. The op-amp can have first and second differential inputs for accepting the first and second differences.

The feedback loop can comprise an error generator. The error generator can accept as inputs the first and second differences. The feedback loop can comprise a plurality of analog-to-digital converters (ADCs) for generating digital inputs to the subtractive adder. The feedback loop can comprise a proportional and integral (PI) filter for converting an output of the subtractive adder to a digital current value. The feedback loop can comprise a digital-to-analog converter (DAC) for converting the digital current value to an analog current.

DESCRIPTION

Figure 4:
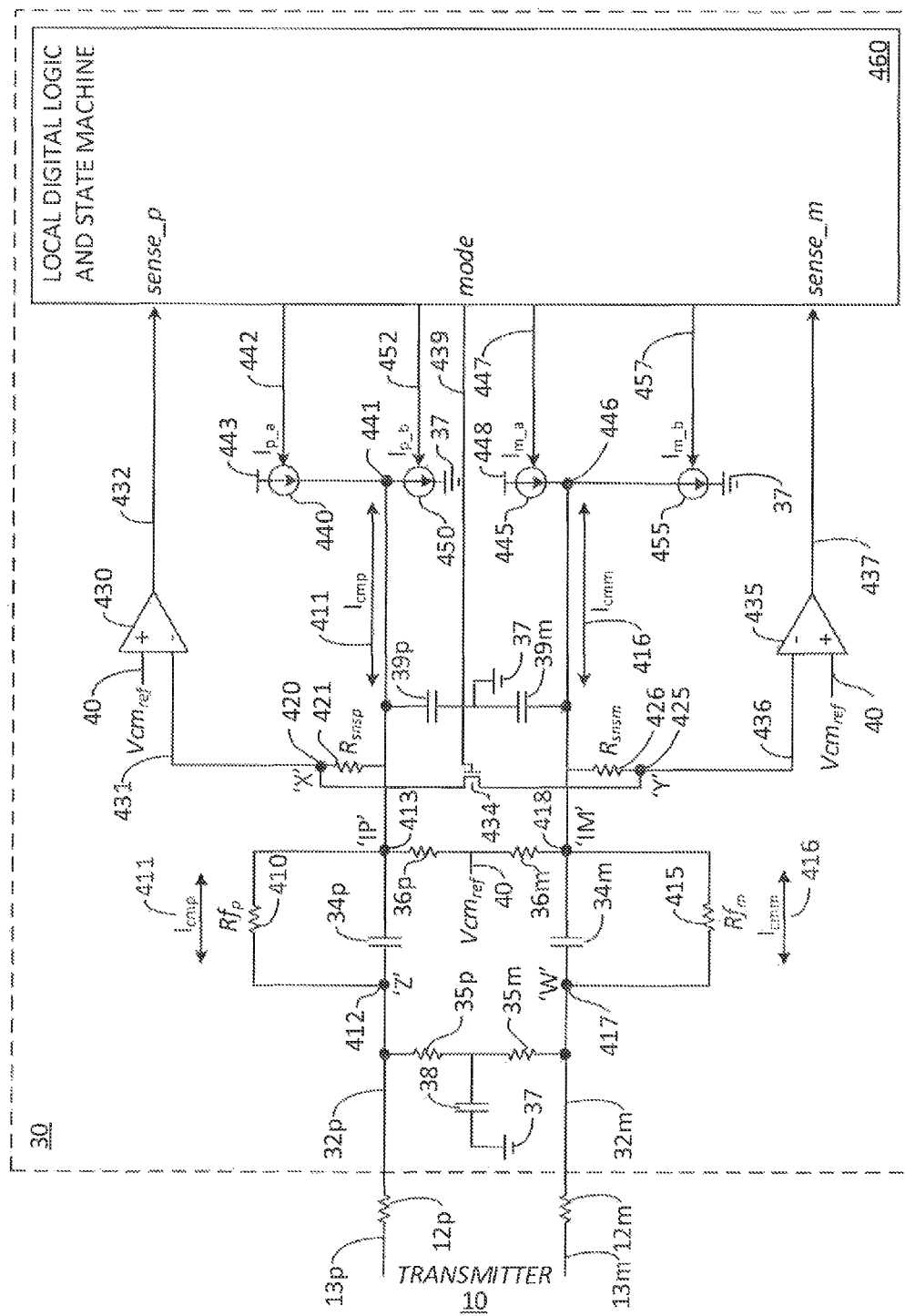
FIG. 4 is a schematic view of an example embodiment of a DC-coupled IC receiver circuit front-end according to an example embodiment of the present disclosure.

A first example embodiment of a DC-coupled receiver circuit front-end that substantially eliminates baseline wander is shown in schematic view in FIG. 4. A first resistive element such as feedback current resistor Rfp 410, Rfm 415 is imposed in parallel across the on-die capacitors 34p, 34m respectively such that a first end thereof is connected at a point 'Z' 412, 'W' 417 to the output of the corresponding transmit differential signalling trace 12p, 12m. Those having ordinary skill in this art will appreciate that the first resistive element may not be limited to a resistor but may comprise any suitable element having a resistivity.

Since the input signal now passes through these feedback current resistors 410, 415, it is low-pass filtered by these resistors and any capacitance present at nodes 'IP' 413 and 'IM' 418. The on-die capacitors 34p, 34m, in parallel with the feedback current resistors 410, 415 cancel the effect of such low-pass filter, permitting a wideband input path.

Voltages are sensed by respective voltage sensors, at one or more points, such as either or both of points 'X' 420 and 'Y' 425. The sensor(s) measure(s) a voltage from their coupling to the signal trace pairs 32p, 32m at points 'X' 420 and 'Y' 425, and used by one or more current adjustors to adjust a direction and magnitude of a programmable current Icmp 411, Icmm 416 flowing across the feedback current resistors 410, 415. The imposition of such currents permits the receiver IC 30 to maintain its desired receiver reference voltage 40 above ground 37 relative to the transmitter reference voltage above ground of the transmitter IC 10 modelled by inputs 431, 436 discussed below, despite the receiver IC 30 being DC-coupled at points 412, 417 to the transmitter IC 10.

In the example embodiment of FIG. 4, a voltage sensor senses the voltages at each of points 'X' 420 and 'Y' 425. Each such sensor comprises a corresponding voltage sense circuit 430, 435.

The voltage sensed by the voltage sensor is used by a corresponding current adjustor which in some example embodiments may comprise a current source 440, 445, a current sink 450, 455 and all or part of a feedback control circuit 460 for driving the current sources 440, 445 and current sinks 450, 455 in response to outputs from the voltage sense circuits 430, 435.

The voltage sense circuits 430, 435 accept as a first input 431, 436 the DC voltage sensed at one of points 'X' 420 and 'Y' 425 and as a second input, the independent receiver DC reference voltage VcmRef 40, compare the two inputs, and generate as an output, a binary state 432, 437 indicative of the comparison status. In some example embodiments, each voltage sense circuit 430, 435 may comprise a two-input comparator. The outputs 432, 437 of the voltage sense circuits 430, 435 determine whether the DC voltage at the signal trace pairs 32p, 32m lies above or below the receiver DC reference voltage 40. The filter resistors 421, 426, in conjunction with sense capacitors (not shown) serve to remove high frequencies from the sense points that may introduce error into the comparison status 432, 437.

In some example embodiments, the p-side and m-side of the receiver circuit 30 may be sensed and controlled independently. In some example embodiments, the p-side and m-side of the receiver circuit 30 may be sensed and controlled as a common-mode signal. In some example embodiments, as shown in FIG. 4, the common-mode may be selectively accessed through an activating transistor Q1 434 that may be activated by a mode signal 439. In some example embodiments, when the activating transistor 434 is activated by the mode signal 439, a common-mode is accessed. In some example embodiments, when the activating transistor 434 is not activated by the mode signal 439, a differential mode is accessed. Thus, the mode signal 439 may access the voltage sensor and the current adjustor in a common-mode or a differential mode.

In some example embodiments, the current sources 440, 445 and the current sinks 450, 455 may comprise respective digital-to-analog converters (DACs) receiving a digital signal input from the feedback control circuit 460. The current sources 440, 445 are driven by and in proportion to an amplitude of their respective inputs Ip_a 442, Im_b 447, while the current sinks 450, 455 are driven by and in proportion to an amplitude of their respective inputs Im_a 452, Im_b 457.

The current sources 440, 445 and the current sinks 450, 455 are connected in pairs to form, with an operative portion of the feedback control circuit 460, a current adjustor, such that the source output of a current source 440, 445 has a common terminal 441, 446 with a sink input of a current sink 450, 455 and a second end of the feedback current resistor 410, 415. This common terminal 441, 446 is connected to a corresponding one of the signal trace pairs 32p, 32m, allowing a current equal to the programmable current Icmp 411, Icmm 416 flowing across the feedback current resistors 410, 415 to pass therealong, since no current will pass across the on-die capacitors 34p, 34m.

In some example embodiments, the current sources 440, 445 are positioned between a positive DC voltage 443, 448 and the common terminal 441, 446 so that current generated by the current source 440, 445 flows into the common terminal 441, 446. In some example embodiments, the current sinks 450, 455 are positioned between the common terminal 441, 446 and the reference ground 37, so that current sunk by the current sink 450, 455 is drawn out of the common terminal 441, 446.

In some example embodiments, if the receiver DC reference voltage 40 is higher than a voltage sensed at points 'X' 420 and/or 'Y' 425, the programmable current Icmp 411, Icmm 416 will be sourced from the current sources 440, 445 from the receiver 30. By contrast, if the receiver DC reference voltage 40 is lower than the voltage sensed at points 'X' 420 and/or 'Y' 425, the programmable current Icmp 411, Icmm 416 will be sunk into the current sinks 450, 451 and into the receiver 30.

The feedback control circuit 460 uses the comparison result(s) between the receiver DC reference voltage 40 and the voltage 431, 436 to generate current source 441, 446 and/or current sink 451, 456 values to drive the current sources 440, 445 and current sinks 450, 455.

In some example embodiments, the feedback control circuit 460 comprises local digital logic and a state machine. The feedback control circuit 460 operates on either or both of the p-side or m-side of the feedback control loop to increase the current source voltage or decrease the current sink voltage or both if the comparison result(s) indicate that the receiver DC reference voltage 40 is higher than the transmitter DC reference voltage 431, 436 and to decrease the current source voltage or increase the current sink voltage if the comparison result(s) indicate that the receiver DC reference voltage 40 is lower than the transmitter DC reference voltage 431, 436, until a steady state condition is achieved.

That is, over time, the amount of current sourced increases and/or the amount of current sunk decreases in proportion to the amount that the receiver DC reference voltage 40 exceeds the transmitter DC reference voltage 431, 436, and that the amount of current sourced decreases and/or the amount of current sunk increases in proportion to the amount that the receiver DC reference voltage 40 is exceeded by the transmitter DC reference voltage 431, 436.

In some example embodiments, the p-side of the feedback control loop is governed by a feedback logical function, which in some example embodiments may be:

a. If(sense_p=1),ip_b++,else ip_a++,  (1)

In some example embodiments, the m-side of the feedback control loop is governed by a feedback logical function, which in some example embodiments may be:

a. If(sense_m=1),im_b++,else im_a++.  (2)

Equations (1) and (2) are examples only for purpose of illustration. Those having ordinary skill in the art will readily appreciate that other functions may be equally or more appropriate in some example embodiments.

In some example embodiments, the feedback control circuit 460 controls the mode signal 439 to control the activation of transistor 434 to activate or deactivate common-mode operation.

In some example embodiments, the feedback control circuit 460 repeatedly samples the comparison result(s) between the receiver DC reference voltage 40 and the voltage 431, 436 represented by the sense_p 432 and sense_m 437 inputs. In some example embodiments, the sample rate is set sufficiently low to ensure that the impedance of the control loop remains relatively high across the spectrum of the incoming signal from the transmitter 10. In the example embodiment disclosed in FIG. 4, this may achieved by driving the digital controller comprising the feedback control circuit 460 with a low frequency clock signal (not shown). In some example embodiments, once a steady state condition has been achieved in which the receiver reference voltage 40 is substantially equal to the desired value, the feedback control circuit 460 may be inhibited by application of an enable/disable signal (not shown). In some example embodiments, such enable/disable signal (not shown) may be toggled with a low duty cycle while in operational or "mission" mode in order to react to slow-moving changes, such as those that may be introduced by temperature changes.

Those having ordinary skill in the art will readily appreciate that the current adjustor and/or feedback control circuit 460 may be implemented in analog form, for example, by a very low bandwidth op-amp (not shown).

The disclosed example embodiments enable the generation of a desired receiver DC voltage independent from the transmitter DC voltage without introducing any AC-coupling capacitor. Consequently, the disclosed example embodiments do not suffer from baseline wander. As such, the use of baseline wander correction circuitry may be avoided as well as any concomitant co-dependency with the link adaptation process.

Rather, in the disclosed example embodiments, the receiver DC voltage control loop remains independent of other receiver blocks and functions.

Further, the sizes of the passive components employed remain reasonably small. The synthesized digital control logic of the feedback control circuit 460 disclosed is small and efficient. Because the generation of the receiver DC voltage occurs primarily during a start-up phase, operational modes are largely unaffected. Further, the comparators that may in some example embodiments comprise the voltage sense circuits 430, 435 employed to sense the voltage difference signal 432, 437 are small and easily and economically implemented and may be time-multiplexed or otherwise shared with other resources.

Figure 5:
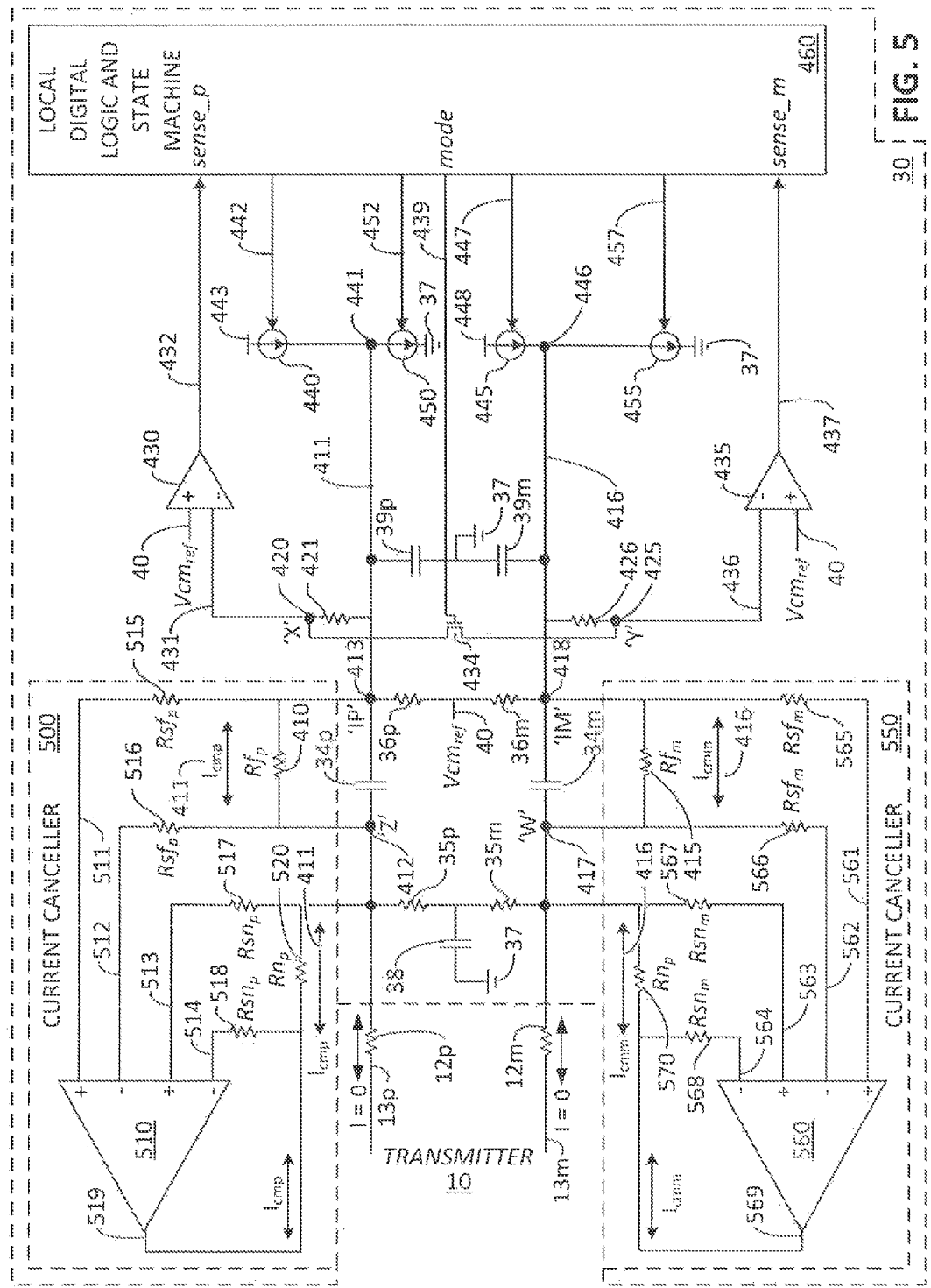
FIG. 5 is a schematic view of an example embodiment of a DC-coupled IC receiver circuit front-end with analog current cancellation circuitry for each differential signal side according to an example embodiment of the present disclosure.

Turning now to FIG. 5, an example embodiment is disclosed in which an analog current cancellation circuit 500, 550 is introduced. The current canceller 500, 550 comprises a second resistive element 520, 570 coupled at a first end 412, 417 to the output 12p, 12m of the transmitter circuit 10. The current canceller 500 550 senses the current 411, 416 through the first resistive element 410, 415 and generates a current of equal amplitude through the second resistive element 520, 570 and effectively absorbing or generating the current flowing through 410, 415. As such, no current interferes with the transmitter circuit 10.

The current canceller 500, 550 sources or sinks the programmable current 411, 416 applied across the feedback current resistors 410, 415 along a pathway away from the point of contact 'Z' 412, 'W' 417 between the receiver termination resistors 35p, 35m and the transmit differential signalling traces 12p, 12m.

While the example embodiment disclosed in FIG. 4 reduces the external current applied to the transmitter IC 10, for example, by maximizing the size of the feedback current resistors 410, 415, it is advantageous, for purposes of system compatibility, to minimize or even eliminate the application of any external current to the transmitter IC 10 along the transmit differential signalling traces 12p, 12m.

This is achieved in the example embodiment of FIG. 5 by employing similar current cancellers 500, 550 respectively on each of the p-side and m-side of the receiver front-end. For ease of illustration, the current canceller 500 on the p-side will now be described.

The current canceller 500 shown in FIG. 5 comprises a feedback circuit to track and present a current equal in amplitude to that passing through the feedback current resistor 410, through a second resistive element such as sense resistor Rnp 520. Those having ordinary skill in this art will appreciate that the second resistive element may not be limited to a resistor but may comprise any suitable element having a resistivity.

Because the sense resistor Rnp 520 is connected at one end to the point 'Z' 412 and to the output of the transmit differential signalling trace Txp 12p and leads away from the point 'Z' 412 in contact with the output of the transmit differential signalling trace 12p, and the current passing through sense resistor Rnp 520 is equal in amplitude to the current passing through feedback current resistor 410, no current is presented to the transmitter circuit 10 at point 'Z' 412.

The feedback circuit comprises an op-amp or an operational transconductance amplifier (OTA) 510 having a pair of differential inputs. A first set of the differential inputs 511, 512 is connected to terminals across the corresponding feedback current resistor 410 so that the voltage across the feedback current resistor 410 is presented at the first set of differential inputs 511, 512 to the op-amp 510. The differential voltage across the feedback current resistor 410, which is proportional to the current passing therethrough by the known resistivity of the feedback current resistor 410, serves as a proxy for the current passing therethrough and permits the current canceller 500 to sense the current passing through the feedback current resistor 410.

In some example embodiments, the differential inputs 511, 512 are connected to the terminals through isolating resistors Rsfp 515, 516. The isolating resistors 515, 516 have relatively high resistance to avoid loading the high-speed input lines with extra capacitance from the circuit cancellation circuit 500. These isolation resistors 515, 516 are easily implemented and compact in an IC implementation.

The isolating resistors 515, 516 form a low-pass filter with a load capacitor (not shown) at the op-amp inputs 511, 512. Since the load capacitors do not load the high-speed input lines, they can be made sufficiently large to provide filtering of the high-speed signal and allow the DC to be isolated.

Designing the op-amp 510 to have limited or low bandwidth may effectively provide further filtering.

In addition to the op-amp 510, the current canceller 500 comprises sense resistor Rnp 520 that is connected at a first end to the common termination point 'Z' 412 of the transmit differential signalling trace Txp 12p and the feedback current resistor 410 (and the on-die capacitor 34p) and at a second end to the output 519 of the op-amp 510. Thus, the sense resistor Rnp 520 defines a current path away from the output of the transmitter circuit 10.

The second set of the differential inputs 513, 514 of the op-amp 510 is connected to first and second terminals across the corresponding sense resistor Rnp 520 so that the voltage across the feedback current resistor 410 is presented at the second of the differential inputs 513, 514 to the op-amp 510. The differential voltage across the sense resistor 520, which is proportional to the current passing therethrough by the known resistivity of the sense resistor 520, serves as a proxy for the current passing therethrough and permits the current canceller 500 to sense the current passing through the sense resistor 520.

In some example embodiments, the differential inputs 511, 512 are connected to the terminals through isolating resistors Rsfp 517, 518. The isolating resistors 517, 518 have relatively high resistance to avoid loading the high-speed input lines with extra capacitance from the circuit cancellation circuit 500. These isolation resistors 517, 518 are easily implemented and compact in an IC implementation.

The isolating resistors 517, 518 form a low-pass filter with a load capacitor (not shown) at the op-amp inputs 513, 514. Since the load capacitors do not load the high-speed input lines, they can be made sufficiently large to provide filtering of the high-speed signal and allow the DC to be isolated.

Designing the op-amp 510 to have limited or low bandwidth may effectively provide further filtering.

In some example embodiments, the filter resistor 421 may be in common with or serve as the isolating resistor 515.

It will be appreciated that the sense resistor 520 shares a common termination point 'Z' 412 with the feedback current resistor 410, so that one of each pair of differential inputs (511, 512), (513, 514) is connected thereto. The op-amp 510 is biased such that the differential input 511, 512, 513, 514 corresponding to each pair connected to the common termination point 412 have opposing signs.

The op-amp 510 in the current cancellation circuit 500 senses the voltage across the feedback current resistor 410 (and thus, indirectly the current passing therethrough) and the voltage across the sense resistor 520 (and thus, indirectly, the current passing therethrough) and subtracts one from the other to create at its output 519 an amplified difference voltage that it presents to the second end of the sense resistor 520, that is, opposite to the end that shares a common termination with the feedback current resistor 410 and the transmit differential signalling trace 12p at point 'Z' 412.

Thus, the output 519 of the op-amp 510 is connected through the sense resistor 520 to the second pair 513, 514 of differential inputs, with opposing sign, so as to create a feedback loop that causes the voltage across the sense resistor 520 to approach and track the amplitude of the voltage across the current feedback resistor 410.

In the described embodiment, because the known resistivity of the sense resistor 520 is equal to that of the feedback current resistor 410 and because the voltages applied across them are equal in amplitude, then at steady state, the current passing across the sense resistor 520 settles to a value equal in amplitude to that passing across the feedback current resistor 410, namely Icmp 411. In other words, the current used in setting up the DC condition of the receiver circuit 30 is sensed by the current cancellation circuit(s) 500, 550 and an equal amplitude current is generated by the current cancellation circuit(s) 500, 550 and passed through the sense resistor 520.

Since the sense resistor 520 shares a common termination point 'Z' 412 with the feedback current resistor, any current 411 sourced or sunk across the feedback current resistor 410 from the receiver circuit 30 passes along the sense resistor 520 and away from the transmit differential signalling trace Txp 12p leading from the transmitter circuit 10 that is also connected at point 'Z' 412. Accordingly, the current cancellation circuit 500 eliminates the application of any external current to the transmitter IC 10 along the transmit differential signalling trace 12p.

Those having ordinary skill in the art will appreciate that the resistance of the sense resistor 520 may be scaled larger so as to reduce the voltage developed across it. Provided that the gain of the sense input is inversely scaled, a corresponding amount before comparing with the reference voltage, the amplitude of the current Icmp 411 passing across it may be maintained equal to that passing across the feedback current resistor 410. By upwardly scaling the resistor, the range of input DC voltage tolerated by the current cancellation circuit 500, 550 may be increased.

The current canceller 550 corresponds in structure and operation on the m-side to the current canceller 500, and comprises, in an example embodiment, op-amp 550 having differential input pairs (561, 562), (563, 564) and output 569, sense resistor 570 connected at a first end to point 'W' 417 and to the transmit differential signalling trace 12m, a first end of feedback current resistor 415 (and on-die capacitor 34m) and at a second end to the output 569 of op-amp 550 and in some example embodiments, isolating resistors 565, 566, 567, 568 and/or load capacitors (not shown).

Figure 6:
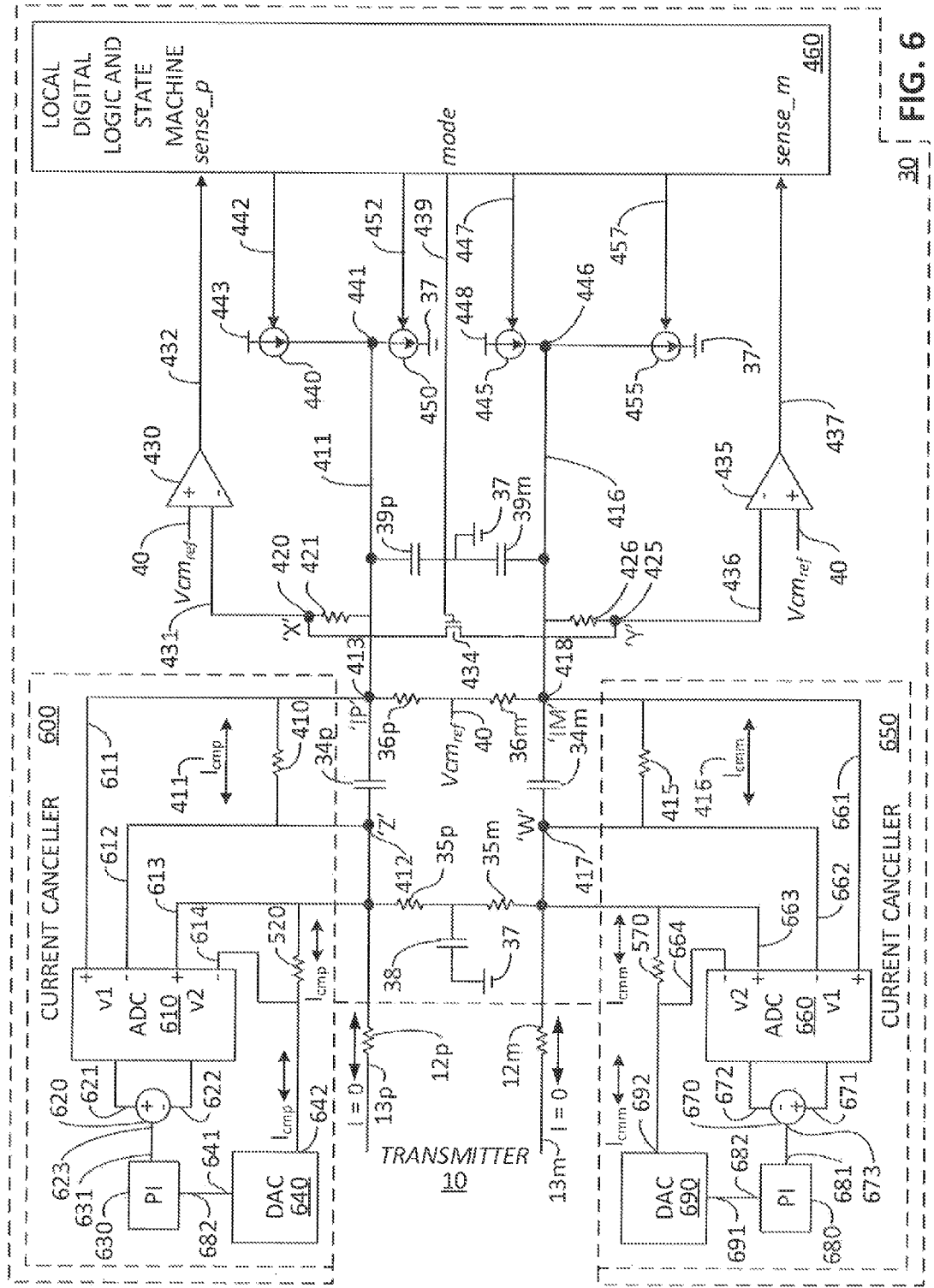
FIG. 6 is a schematic view of an example embodiment of a DC-coupled IC receiver circuit front-end with digital current cancellation circuitry for each different signal side according to an example embodiment of the present disclosure.

Turning now to FIG. 6, an example embodiment is disclosed in which a digital current canceller 600, 650 is employed. As with the example embodiment of FIG. 5, the digital current canceller 600 that operates on the p-side is substantially identical to that 650 that operates on the m-side, so that, for purposes of simplicity, the structure and operation of the p-side circuit 600 only is described.

As with the analog current canceller 500, the digital current canceller 600 comprises a second resistive element such as sense resistor 520 and a feedback circuit that senses the voltage across the feedback current resistor 410 (and thus, the current passing therethrough) and the voltage across the sense resistor 520 (and thus, the current passing therethrough) and subtracts one from the other to create an error signal that it presents to the end of the sense resistor 520 that shares a common termination 412 with the feedback current resistor. The resulting (in this case digital) feedback loop causes the voltage across the sense resistor 520 to approach and track the voltage across the feedback current resistor 410 so that it generates a current across the sense resistor 520 that settles at a value equal in amplitude to the current sensed by the feedback loop across the feedback current resistor and away from the transmit differential signalling trace 12p so as to eliminate the application of any external current to the transmitter IC 10 along the transmit differential signalling trace 12p.

In this digital implementation, however, the analog op-amp 510 is replaced by digital components, namely a plurality of analog-to-digital converters (ADCs) 611, 612, 613, 614, at least one error generator 620, a proportional and integral (PI) filter 630 and a digital-to-analog converter (DAC) 640.

ADCs 611, 612 measure the voltage at each end of the feedback current resistor 410. The difference between these voltages, representing a differential voltage value that serves as a proxy for the current passing through the feedback current resistor 410 is presented as V1_dig to a first minuend input 621 of the error generator 620.

In some example embodiments, the difference is obtained by a further error generator (not shown) at which the voltage value captured by ADC 611 is presented to a minuend input (not shown) and the voltage value captured by ADC 612 is presented to a subtrahend input (not shown).

ADCs 613, 614 measure the voltage at each end of the sense resistor 520. The difference between these voltages, representing a differential voltage value that serves as a proxy for the current passing through the sense resistor 520 is presented as V2_dig to a second subtrahend input 622 of the error generator 620.

In some example embodiments, the difference is obtained by a further error generator (not shown) at which the voltage value captured by ADC 613 is presented to a minuend input (not shown) and the voltage value captured by ADC 614 is presented to a subtrahend input (not shown).

The difference between V1_dig and V2_dig is obtained at the output 623 of the error generator 620 and presented as an error signal to the input 631 of the PI filter 630.

The error signal is presented at the output 631 of the PI filter 630 to the input 641 of the DAC 640, where it is converted again to an analog current value and presented at the output 641 of the DAC 640 to the second end of the sense resistor 520.

The current canceller 650 corresponds in structure and operation on the m-side to the current canceller 600, and comprises, in an example embodiment, sense resistor 570, ADCs 661, 662, 663,664, error generator 670 having a minuend input 671, a subtrahend input 672 and an output 673, PI filter 680 having an input 681 and output 682, and DAC 690 having an input 691 and output 692.

In some example embodiments, the low-pass filter formed in the analog example embodiment of FIG. 5 using the isolating resistors 515, 516, 517, 518 in conjunction with load capacitors (not shown) and by judicious design of the bandwidth of the op-amp 510, may be digitally synthesized in the digital example embodiment of FIG. 6 in synthesized logic (not shown) or implemented in firmware code (not shown) executed on a local CPU (not shown), if such is available.

In the example embodiments of FIGS. 5 and 6, the voltage (and correspondingly current) is sensed separately on each side (p-side, m-side) of the differential circuit. While increasing component count, it may afford increased versatility.

Figure 7:
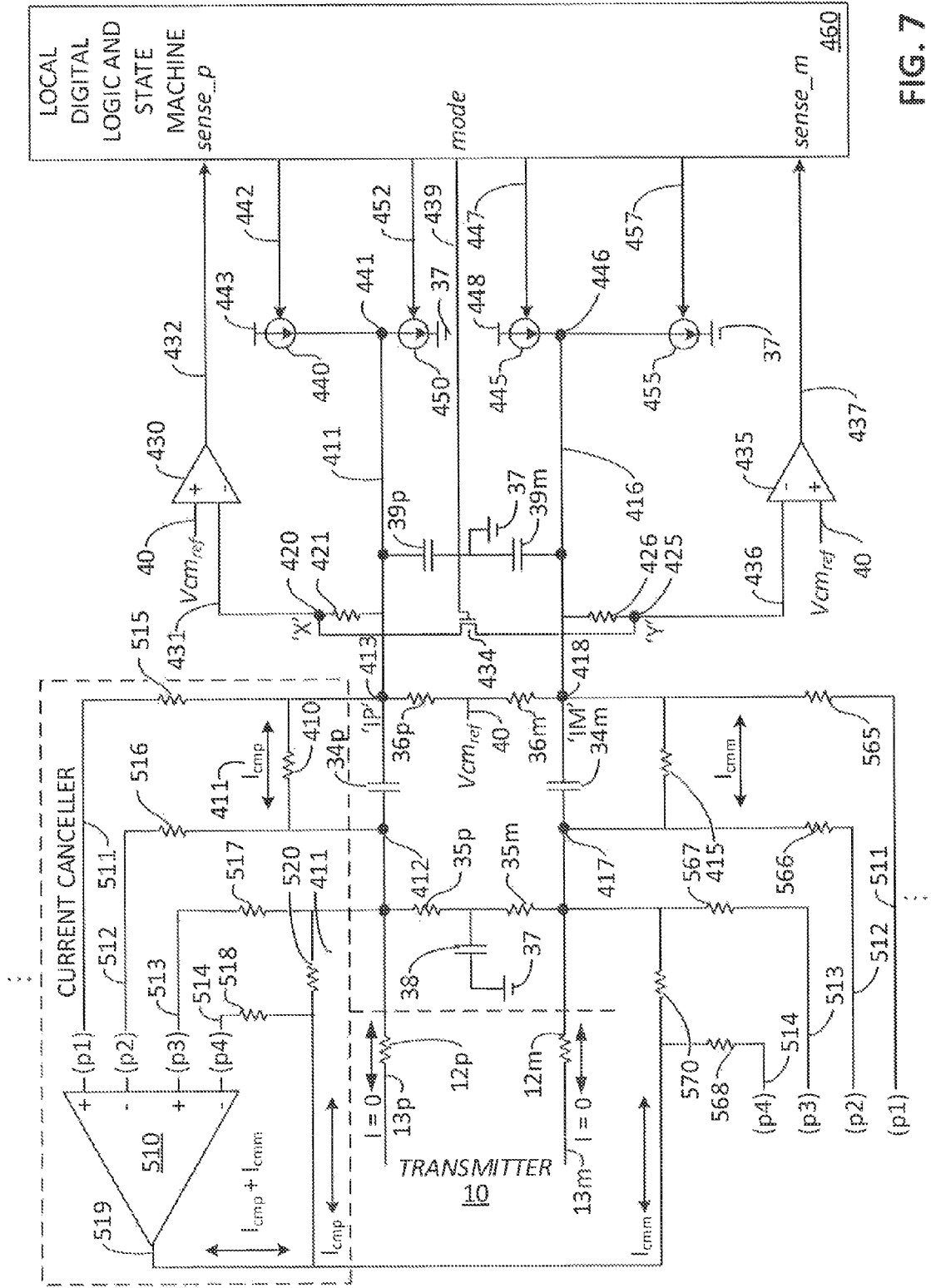
FIG. 7 is a schematic view of an example embodiment of a DC-coupled IC receiver circuit front-end with common-mode current cancellation circuitry according to an example embodiment of the present disclosure.

Turning now to FIG. 7, there is shown a common-mode example embodiment of a DC-coupled common mode receiver front end with current cancellation.

The common-mode example embodiment closely resembles the analog example embodiment of FIG. 5, but with a single op-amp 510, that is, dispensing with the op-amp 560 of FIG. 5. The inputs 511, 512, 513, 514 to the op-amp 510 are connected to both the isolation resistors 515, 516, 517, 518 respectively and also to the isolation resistors 565, 566, 567, 568. That is, corresponding pairs of isolation resistors from the p-side (515, 516, 517, 518) and the m-side (565, 566, 567, 568) are shorted together and presented to the corresponding inputs (511, 512, 513, 514) of the op-amp 510. Similarly, the output 519 of the op-amp 510 is presented to the second end of both the p-side sense resistor 520 and the m-side sense resistor 570.

Thus, the feedback circuit senses the common-mode only. It will be appreciated that the current output at 519 by the op-amp 510 in this common-mode example embodiment will be substantially twice that output at 519 by the op-amp 510 in the differential mode analog embodiment of FIG. 5, because it is applied to both sense resistors 520, 570.

It will be appreciated that a digital common-mode embodiment would be readily apparent to a person having ordinary skill in this art.

The DC-coupled receiver front end described in any or all of FIGS. 4 through 7 may be implemented without limiting the generality of the foregoing, in application-specific integrated circuits (ASICs), serializer I deserializer (SerDes) devices and similar circuits. Applications for such DC-coupled receiver front ends may include, without limitation, installation on PCBs, in repeaters, drivers, switches, routers and the like.

Having described in detail example embodiments that are in accordance with the present disclosure, it is noted that the embodiments reside primarily in combinations of apparatus components and processing actions related to interactions between complementary differential circuits, whether or not specifically identified as a transmitter and a receiver.

In some example embodiments, the receiver may form part of a base station. In some example embodiments, the receiver may form part of a mobile communications device. Although some embodiments may include mobile devices, not all embodiments are limited to mobile devices; rather, various embodiments may be implemented within a variety of communications devices or terminals, including handheld devices, mobile telephones, or personal digital assistants (PDAs)

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and method actions can be performed by a programmable processor executing a program of instructions to perform functions of the disclosure by operating on input data and generating output.

The disclosure can be implemented advantageously on a programmable system including at least one input device, and at least one output device.

Moreover, explicit use of the term "module", "processor" or "controller" should not be construed to refer exclusively to a particular configuration of hardware.

In some instances, detailed descriptions of well-known devices, circuits and methods are omitted so as not to obscure the description of the present disclosure with unnecessary detail.

In the foregoing disclosure, for purposes of explanation and not limitation, specific details are set forth in order to provide a thorough understanding of the present disclosure.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

Certain terms are used throughout to refer to particular components. Manufacturers may refer to a component by different names. Use of a particular term or name is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

The purpose of the Abstract is to enable the relevant patent office or the public generally, and specifically, persons of ordinary skill in the art who are not familiar with patent or legal terms or phraseology, to quickly determine from a cursory inspection, the nature of the technical disclosure. The Abstract is neither intended to define the scope of this disclosure, which is measured by its claims, nor is it intended to be limiting as to the scope of this disclosure in any way.

While example embodiments are disclosed, this is not intended to be limiting. Rather, the general principles set forth herein are considered to be merely illustrative of the scope of the present disclosure.

It will be apparent that various modifications and variations covering alternatives, modifications and equivalents may be made to the embodiments disclosed herein, without departing from the spirit and scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

In particular, features from one or more of the above-described embodiments may be selected to create alternative embodiments comprised of a sub-combination of features that may not be explicitly described above. In addition, features from one or more of the above-described embodiments may be selected and combined to create alternative embodiments comprised of a combination of features that may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

Other embodiments consistent with the present disclosure will be apparent from consideration of the specification and the practice of the disclosure disclosed therein. Accordingly the specification and the embodiments disclosed therein are to be considered examples only, with a true scope and spirit of the disclosure being disclosed by the following numbered claims:

What is claimed is:

1. A front-end of a first differential circuit that is DC-coupled to a second differential circuit, comprising:
   a resistive element, having a resistivity between a first end that is DC-coupled to the second circuit and a second end that is DC-coupled to the first circuit, for accepting a programmable current passing therethrough to impose a voltage thereacross, that varies in direction and amplitude according to the current value;
   a voltage sensor for sensing a difference between a DC voltage at the second end of the resistive element and a desired reference voltage of the first circuit; and
   a current adjustor for adjusting a direction and amplitude of the programmable current so that the DC voltage of the first circuit matches the desired reference voltage of the first circuit.

2. A front-end according to claim 1, wherein the first circuit is a receiver circuit.

3. A front-end according to claim 1, wherein the second circuit is a transmitter circuit.

4. A front-end according to claim 1, wherein the resistive element is a resistor.

5. A front-end according to claim 1, wherein the voltage sensor comprises a comparator for comparing the DC voltage with the desired reference voltage.

6. A front-end according to claim 1, wherein the current adjustor comprises a current source.

7. A front-end according to claim 6, wherein the current source generates current if the desired reference voltage is greater than the DC voltage.

8. A front-end according to claim 7, wherein an amplitude of the current generated by the current source increases in proportion to an amount the desired reference voltage exceeds the DC voltage.

9. A front-end according to claim 7, wherein an amplitude of the current generated by the current source decreases in proportion to an amount the desired reference voltage is exceeded by the DC voltage.

10. A front-end according to claim 6, wherein the current source is positioned between a positive DC voltage and the second end of the resistive element.

11. A front-end according to claim 6, wherein the current source comprises a digital-to-analog converter (DAC) for outputting a current value in response to a digital current input value.

12. A front-end according to claim 1, wherein the current adjustor comprises a current sink.

13. A front-end according to claim 12, wherein the current sink sinks current if the desired reference voltage is less than the DC voltage.

14. A front-end according to claim 12, wherein an amplitude of the current sunk by the current sink decreases in proportion to an amount the desired reference voltage exceeds the DC voltage.

15. A front-end according to claim 12, wherein an amplitude of the current sunk by the current sink increases in proportion to an amount the desired reference voltage is exceeded by the DC voltage.

16. A front-end according to claim 12, wherein the current source is positioned between the second end of the resistive element and a reference ground.

17. A front-end according to claim 12, wherein the current sink comprises a digital-to-analog converter (DAC) for outputting a current value in response to a digital current input value.

18. A front-end according to claim 1, wherein the current adjustor comprises a feedback control circuit for controlling an amount and direction of current generated in response to a comparison between the desired reference voltage and the DC voltage.

19. A front-end according to claim 18, wherein the feedback control circuit accesses the voltage sensor and current adjustor in a common-mode.

20. A front-end according to claim 18, wherein the feedback control circuit accesses the voltage sensor and current adjustor in a differential mode.

21. A front-end of a first common-mode voltage circuit that is DC-coupled to an output of a second common-mode voltage circuit, comprising:
a first resistive element, having a resistivity between a first end that is DC-coupled to the second circuit and a second end that is DC-coupled to an input of the first circuit, for accepting a programmable current passing therethrough to impose a voltage thereacross, that varies in direction and amplitude according to the current value;
a voltage sensor for sensing a difference between a DC voltage at the second end of the first resistive element and a desired reference voltage of the first circuit;
a current adjustor for adjusting a direction and amplitude of the programmable current so that the voltage of the first circuit matches the desired reference voltage; and
a current canceller comprising a second resistive element connected at a first end to the output of the second circuit, the current canceller for sensing the programmable current and for generating a current of equal amplitude through the second resistive element and away from the output of the second circuit.

22. A front-end according to claim 21, wherein the first circuit is a receiver circuit.

23. A front-end according to claim 21, wherein the second circuit is a transmitter circuit.

24. A front-end according to claim 23, wherein the second resistive element is a resistor.

25. A front-end according to claim 23, wherein the current canceller senses the programmable current by sensing a voltage at each end of the first resistive element and determining a first difference therein that is proportional to the programmable current by a known resistivity of the first resistive element.

26. A front-end according to claim 25, wherein the current canceller senses the current generated through the second resistive element by sensing a voltage at each end of the second resistive element and determining a second difference therein that is proportional to the generated current by a known resistivity of the second resistive element.

27. A front-end according to claim 26, wherein the current canceller comprises a feedback loop the first and second differences as inputs and for generating as an output, the current passing through the second resistive element.

28. A front-end according to claim 27, wherein the feedback loop adjusts the current generated until the second difference approaches the first difference.

29. A front-end according to claim 27, wherein the known resistivity of the first resistive element is equal to the known resistivity of the second resistive element.

30. A front-end according to claim 27, wherein the feedback loop comprises an op-amp.

31. A front-end according to claim 30, wherein the op-amp has first and second differential inputs for accepting the first and second differences.

32. A front-end according to claim 27, wherein the feedback loop comprises an error generator.

33. A front-end according to claim 32, wherein the error generator accepts as inputs the first and second differences.

34. A front-end according to claim 32, wherein the feedback loop comprises a plurality of analog-to-digital converters (ADCs) for generating digital inputs to the error generator.

35. A front-end according to claim 32, wherein the feedback loop comprises a proportional and integral (PI) filter for converting an output of the subtractive adder to a digital current value.

36. A front-end according to claim 35, wherein the feedback loop comprises a digital-to-analog converter (DAC) for converting the digital current value to an analog current.

* * * * *

UNITED STATES PATENT AND TRADEMARK OFFICE
CERTIFICATE OF CORRECTION

PATENT NO. : 9,306,609 B1  
APPLICATION NO. : 14/595303  
DATED : April 5, 2016  
INVENTOR(S) : Marc-Andre LaCroix Page 1 of 1

It is certified that error appears in the above-identified patent and that said Letters Patent is hereby corrected as shown below:

In the specification,

Column 1, line 47, "11$lk$" should read --11$k$--

Column 1, line 57, "RT$_{Xim}$" should read --R$_{TXim}$--

Column 2, line 49, "Rim" should read --R1$m$--

Column 14, line 7, "serializer I deserializer" should read --serializer / deserializer--

Signed and Sealed this  
Twenty-eighth Day of June, 2016

Michelle K. Lee  
*Director of the United States Patent and Trademark Office*